(12) United States Patent
Chen et al.

(10) Patent No.: US 11,164,097 B2
(45) Date of Patent: Nov. 2, 2021

(54) METHOD FOR PRELOADING APPLICATION, STORAGE MEDIUM, AND TERMINAL DEVICE

(71) Applicant: Guangdong Oppo Mobile Telecommunications Corp., Ltd., Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 410 days.

(21) Appl. No.: 16/206,169

(22) Filed: Nov. 30, 2018

(65) Prior Publication Data
US 2019/0188595 A1    Jun. 20, 2019

(30) Foreign Application Priority Data
Dec. 20, 2017   (CN) .......................... 201711384839.X

(51) Int. Cl.
*G06F 7/60*   (2006.01)
*G06N 7/00*   (2006.01)
(Continued)

(52) U.S. Cl.
CPC ............. *G06N 7/005* (2013.01); *G06F 9/445* (2013.01); *G06F 17/18* (2013.01); *G06N 5/003* (2013.01); *G06N 20/00* (2019.01); *H04L 67/04* (2013.01)

(58) Field of Classification Search
CPC .................................................... G06N 7/005
(Continued)

(56) References Cited

U.S. PATENT DOCUMENTS

2012/0110174 A1    5/2012   Wootton et al.
2013/0173513 A1    7/2013   Chu et al.
(Continued)

FOREIGN PATENT DOCUMENTS

| CN | 105939416 A | 9/2016 |
| CN | 107066290 A | 8/2017 |
| CN | 107451694 A | 12/2017 |

OTHER PUBLICATIONS

"Research on Telecom Customer Churn Prediction System Based on Data Mining", Gao Yang, "Full-text Database Information Technology Series of Excellent Master's Degree Thesis of China", No. 02, 2014, Feb. 15, 2014.
(Continued)

*Primary Examiner* — Timothy A Mudrick
(74) *Attorney, Agent, or Firm* — Young Basile Hanlon & MacFarlane, P.C.

(57) ABSTRACT

A method for preloading an application, a storage medium, and a terminal device are provided. The method includes the following. Current state feature information of the terminal device is acquired, when an application preloading prediction event is detected to be triggered. The current state feature information is input into a plurality of CART prediction models each corresponding to an application in a preset application set, where each of the CART prediction models is generated based on a usage regularity of an associated application corresponding to historical state feature information of the terminal device. A target application to be initiated is predicted according to output results of the CART prediction models, and then the target application is preloaded.

17 Claims, 6 Drawing Sheets

(51) Int. Cl.
*G06F 17/18* (2006.01)
*H04L 29/08* (2006.01)
*G06F 9/445* (2018.01)
*G06N 5/00* (2006.01)
*G06N 20/00* (2019.01)

(58) Field of Classification Search
USPC .............................................................. 703/2
See application file for complete search history.

(56) References Cited

U.S. PATENT DOCUMENTS

2013/0339422 A1    12/2013    Kaleem et al.
2014/0366041 A1    12/2014    Stanley-Marbell et al.

OTHER PUBLICATIONS

English translation of first office action issued in corresponding CN application No. 201711384839.X dated Apr. 13, 2020.
Examination report issued in corresponding European application No. 18204905.6 dated Jun. 9, 2020.
International search report issued in corresponding international application No. PCT/CN2018/113190 dated Jan. 30, 2019.
Examination Report issued in corresponding European application No. 18204905.6 dated Dec. 11, 2020.
Wei-Yin Loh:"Classification and regression trees: Classification and regression trees", Wiley Interdisciplinary Reviews:Data Mining and Knowledge Discovery, vol. 1, No. 1, Jan. 1, 2011.
Extended European search report issued in corresponding European application No. 18204905.6 dated May 17, 2019.
First examination report and English translation of issued in corresponding IN application No. 201814045116 dated Jul. 29, 2020.

METHOD FOR PRELOADING APPLICATION, STORAGE MEDIUM, AND TERMINAL DEVICE

CROSS-REFERENCE TO RELATED APPLICATION(S)

This application claims priority to Chinese Patent Application No. 201711384839.X, filed on Dec. 20, 2017, the disclosure of which is hereby incorporated by reference in its entirety.

TECHNICAL FIELD

The disclosure relates to the field of machine learning technology, and more particularly to a method and an apparatus for preloading an application, a storage medium, and a terminal device.

BACKGROUND

At present, with rapid development of smart terminal technologies, smart devices such as smart phones, tablet computers, smart TVs, and the like, have become indispensable electronic devices in people's life.

Various applications (application software, APP) are installed on a smart terminal. In general, the loading of an application begins only when a user initiates an application. However, the storage space occupied by the application is getting larger and larger, and the loading time is also getting longer and longer, which wastes a lot of precious time of the user to wait the loading of the application. In order to make the application run more smoothly, some smart terminals will prepare loading resources of some applications in advance, that is, preload some applications in advance.

However, applications cannot be arbitrarily preloaded, because if too many resources are preloaded, they will occupy much storage space, and power consumption will become higher, which will seriously affect the fluency of the use of a terminal. Therefore, how to optimize the preloading mechanisms and reduce the power consumption of the terminal becomes critical.

SUMMARY

Implementations of the disclosure provide a method for preloading an application, a storage medium, and a terminal device.

According to a first aspect, the implementations of the disclosure provide a method for preloading an application, which is applied to a terminal device. The method includes the following. Current state feature information of the terminal device is acquired, when an application preloading prediction event is detected to be triggered. The current state feature information is input into a plurality of classification and regression tree (CART) prediction models each corresponding to an application in a preset application set, where each of the CART prediction models is generated based on a usage regularity of an associated application corresponding to historical state feature information of the terminal device. A target application to be initiated is predicted according to output results of the CART prediction models, and then the target application is preloaded.

According to a second aspect, the implementations of the disclosure provide a non-transitory computer-readable storage medium. The non-transitory computer-readable storage medium is configured to store computer programs which, when executed by a processor, cause the processor carry out the following actions. Current state feature information of a terminal device is acquired, when an application preloading prediction event is detected to be triggered. The current state feature information is input into a plurality of CART prediction models each corresponding to an application in a preset application set, where each of the CART prediction models is generated based on a usage regularity of an associated application corresponding to historical state feature information of the terminal device. A target application to be initiated is predicted according to output results of the CART prediction models, and then the target application is preloaded.

According to a third aspect, the implementations of the disclosure provide a terminal device. The terminal device includes at least one processor and a computer readable storage coupled to the at least one processor. The computer readable storage stores at least one computer executable instruction thereon, which when executed by the at least one processor, cause the at least one processor to carry out the following actions. Current state feature information of the terminal device is acquired, when an application preloading prediction event is detected to be triggered. The current state feature information is input into a plurality of CART prediction models each corresponding to an application in a preset application set, where each of the CART prediction models is generated based on a usage regularity of an associated application corresponding to historical state feature information of the terminal device. A target application to be initiated is predicted according to output results of the CART prediction models, and then the target application is preloaded.

BRIEF DESCRIPTION OF THE DRAWINGS

To describe technical solutions in the implementations of the disclosure or of the related art more clearly, the following briefly introduces the accompanying drawings required for describing the implementations of the disclosure. Apparently, the accompanying drawings in the following description illustrate some implementations of the disclosure. Those skilled in the art may also obtain other drawings based on these accompanying drawings without creative efforts.

DETAILED DESCRIPTION

Figure 1:
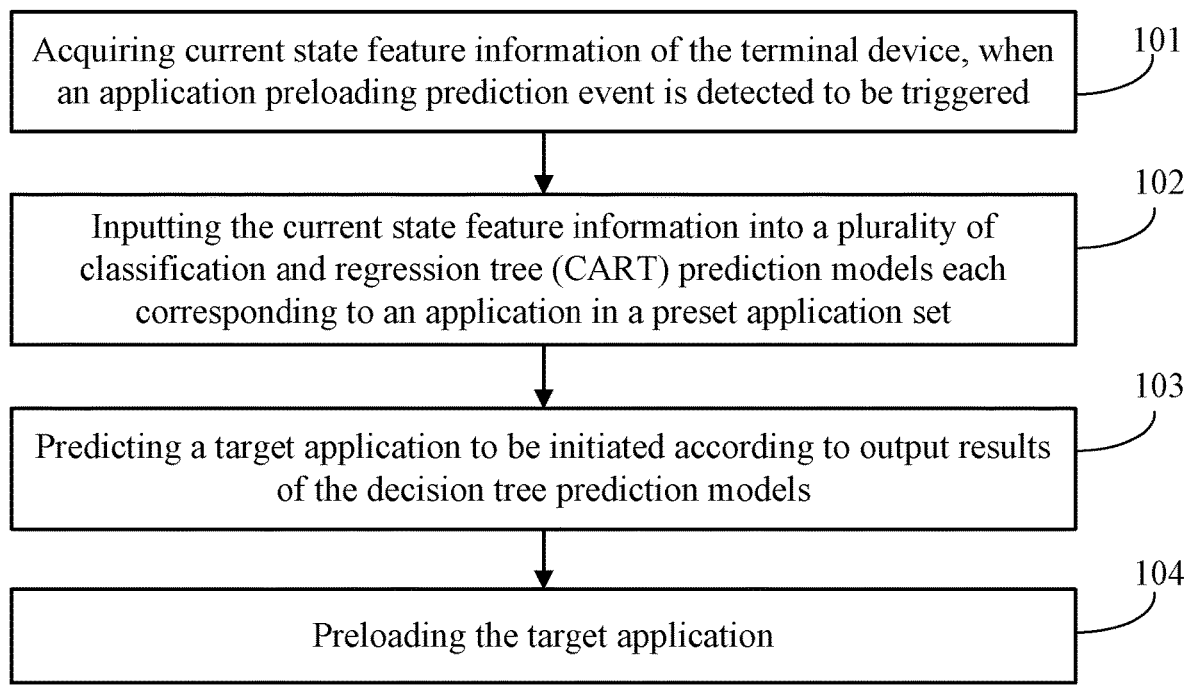
FIG. 1 is a schematic flowchart of a method for preloading an application according to an implementation of the disclosure.

Technical solutions of the disclosure will be further described below with reference to the accompanying drawings and specific implementations. It is understood that the specific implementations described herein are merely used to explain the disclosure, rather than limiting the disclosure. In addition, it should be noted that, for convenience of description, only part rather than all of the structures related to the disclosure are illustrated in the accompanying drawings.

Before discussing the exemplary implementations in more detail, it should be noted that some exemplary implementations are described as a process or a method depicted as a flowchart. Although the flowcharts describe the various steps as a sequential process, many of the steps can be implemented in parallel, concurrently, or simultaneously. In addition, the order of the steps can be rearranged. The process may be terminated when its operation is completed, but may also have additional steps not included in the accompanying drawings. The processing may correspond to methods, functions, procedures, subroutines, subprograms, and the like.

On a terminal device, preloading applications is a common and effective way to improve user experience. By preparing loading resources of some applications in advance, the applications can be allowed to run more smoothly.

In related arts, the applications are preloaded mainly based on statistical methods. For example, there may be only a few applications that are most frequently used by a user, and all of them are preloaded. For another example, the applications are ranked according to a user's usage habits, and the applications that are ranked higher are preloaded. However, the association information among the applications, time information, terminal state information, etc., are not taken into account in the above methods. As a result, prediction accuracy of the application to be preloaded is not high enough, and too many resources need to be preloaded, while only one application will be actually used by a user at the next moment, which affects the user experience. Therefore, it is important to predict accurately which application the user will initiate at the next moment.

According to implementations of the disclosure, a method for preloading an application is provided. The method includes: acquiring current state feature information of the terminal device, when an application preloading prediction event is detected to be triggered; inputting the current state feature information into a plurality of classification and regression tree (CART) prediction models each corresponding to an application in a preset application set, where each of the CART prediction models is generated based on a usage regularity of an associated application corresponding to historical state feature information of the terminal device; predicting a target application to be initiated according to output results of the CART prediction models; and preloading the target application.

According to implementations of the disclosure, an apparatus for preloading an application is provided. The apparatus includes a state acquiring module, a feature information inputting module, a predicting module, and a preloading module. The state acquiring module is configured to acquire current state feature information of a terminal device, when an application preloading prediction event is detected to be triggered. The feature information inputting module is configured to input the current state feature information into a plurality of CART prediction models each corresponding to an application in a preset application set, where each of the CART prediction models is generated based on a usage regularity of an associated application corresponding to historical state feature information of the terminal device.

The predicting module is configured to predict a target application to be initiated according to output results of the CART prediction models. The preloading module is configured to preload the target application.

According to implementations of the disclosure, a terminal device is provided. The terminal device includes at least one processor and a computer readable storage coupled to the at least one processor. The computer readable storage stores at least one computer executable instruction thereon, which when executed by the at least one processor, cause the at least one processor to carry out the following actions. Current state feature information of the terminal device is acquired, when an application preloading prediction event is detected to be triggered. The current state feature information is input into a plurality of CART prediction models each corresponding to an application in a preset application set, where each of the CART prediction models is generated based on a usage regularity of an associated application corresponding to historical state feature information of the terminal device. A target application to be initiated is predicted according to output results of the CART prediction models, and then the target application is preloaded.

According to implementations of the disclosure, a non-transitory computer readable storage medium is provided. The non-transitory computer readable storage medium is configured to store computer programs which, when executed by a processor, cause the processor to carry out following actions. Current state feature information of a terminal device is acquired, when an application preloading prediction event is detected to be triggered. The current state feature information is input into a plurality of CART prediction models each corresponding to an application in a preset application set, where each of the CART prediction models is generated based on a usage regularity of an associated application corresponding to historical state feature information of the terminal device. A target application to be initiated is predicted according to output results of the CART prediction models, and then the target application is preloaded.

The implementations of the disclosure will be detailed below with reference to the accompanying drawings.

FIG. 1 is a schematic flowchart of a method for preloading an application according to an implementation of the disclosure. The method can be implemented by an apparatus for preloading an application. The apparatus may be implemented by software and/or hardware, and generally integrated in a terminal device. As illustrated in FIG. 1, the method begins at block 101.

At block 101, current state feature information of the terminal device is acquired, when an application preloading prediction event is detected to be triggered.

In the implementation of the disclosure, when the application preloading prediction event is detected to be triggered, the current state feature information of the terminal device is acquired, so as to control the preloading of the application.

It can be understood that, when the system monitors a preloading notification, content of the preloading notification is read, and it is determined from the read preloading notification content that the application needs to be preloaded. At this time, if the application is detected not to be loaded, the application preloading prediction event is triggered. When a user actively clicks to open an application preloading prediction permission, the characterization application preloading prediction event is triggered. It should be noted that the specific expression of the application preloading prediction event being triggered is not limited in the implementation of the present disclosure.

The current state feature information of the terminal may include at least one of: time information, a date category, a switching state of a mobile data network, a connection state of a wireless hotspot, identity information of a connected wireless hotspot, applications currently running, a previous foreground application, a duration of a current application staying in the background, a time point at which the current application was last switched to the background, plugging and unplugging states of an earphone jack, a charging state, power information of a battery, a display duration of a screen, motion state and location information of the terminal device.

The time information can be understood as a current time period corresponding to the terminal device. For example, the time information may include morning rush hour, midday hour, evening rush hour, working time, and rest time. Alternatively, the time information can also be configured by equally dividing one day with 24 hours (0:00 am-24:00 pm). For example, one day is divided into 6 time periods with each time period being 4 hours. The time information can be recorded in the form of a timestamp. The date category may include workdays and holidays, and may also be recorded in the form of a timestamp. The switching state of the mobile data network may include an on-state and an off-state of the mobile data network. It can be understood that, when the mobile data network is in the on-state, the terminal device can conduct a series of Internet operations (such as web browsing) through the mobile data network; when the mobile data network is in the off-state, the terminal device cannot conduct Internet operations such as web browsing through the mobile data network. The connection state of the wireless hotspot may include a connected state and a disconnected state of the wireless hotspot. When the wireless hotspot is in the connected state, the current state feature information may further include the identity information of the connected wireless hotspot. The identity information of the connected wireless hotspot may include a service set identifier (SSID) and a basic service set identity (BSSID). The application currently running can be understood as the applications running in the foreground or running in the background of the terminal device. Identifier information of the applications currently running, which can uniquely identify the applications currently running, such as a package name and/or a component name of the applications currently running, can be acquired. The previous foreground application can be understood as an application that last ran in the foreground before a current foreground application runs in the foreground of the terminal device. The duration of a current application staying in the background can be understood as a length from the current application being switched to the background to being completely cleared from the background. The current application can be any one of the applications installed in the terminal device. The current application can be the same as or different from the application currently running. Similarly, the current application can be the same as or different from the previous foreground application. The time point at which the current application was last switched to the background can be understood as the moment at which the current application was last switched to the background. According to the time point, a duration from the time point at which the target application was last switched to the background to a current moment can be determined. The plugging and unplugging states of an earphone jack can be understood as an earphone and the terminal device being connected or disconnected. The charging state may include whether the terminal device is in a charging mode, and may further include a charging mode type when the terminal device is in the charging mode. The charging mode type can include a fast charging mode and a normal charging mode. In the fast charging mode, the terminal device is charged by a fast charging power adapter (such as a mobile power supply). In the normal charging mode, the terminal device is charged by a normal power adapter (such as an original charger of the terminal device). The power information of the battery can be understood as a current remaining power of the terminal. The display duration of the screen can be understood as a most recent screen-on duration. The motion state may include a current speed and/or acceleration of the terminal device. The location information can be understood as the specific location where the terminal device is currently located, including provinces, cities, districts, counties, even specific to street names, building names, and the like.

At block 102, the current state feature information is input into a plurality of CART prediction models each corresponding to an application in a preset application set.

Each of the CART prediction models is generated based on a usage regularity of an associated application corresponding to historical state feature information of the terminal device.

In the implementation of the disclosure, the preset application set may include all or part of applications installed in the terminal device. The number and types of the applications included in the preset application set are not specifically limited. Although various applications are usually installed in a terminal device, the number of the applications used by the user is limited in a predetermined time period, such as one day, and the number of the applications frequently used by the user is also limited. Most applications are used less frequently, and may be used only once a week or even a month. If the current state feature information is respectively input into the CART prediction models corresponding to all applications installed in the terminal device, not only is the data amount large, but the prediction accuracy of the application to be preloaded is not significantly improved. Alternatively, the applications may be sorted according to the usage frequencies of the applications in a predetermined time period, M most frequently used applications are determined according to the sorting result, and the M most frequently used applications are taken as the applications included in the preset application set. M can be set according to actual situations. For example, M is set to be a product of all the applications installed in the terminal device and a preset coefficient, and the preset coefficient is 0.3, for example.

For each application in the preset application set, the current state feature information is input into the CART prediction model corresponding to a current application. For example, the preset application set includes five applications which are named application A, application B, application C, application D, and application E. The CART prediction models corresponding to the application A, the application B, the application C, the application D, and the application E are respectively named CART prediction model A1, CART prediction model B1, and CART prediction model C1, CART prediction model D1 and CART prediction model E1. The current state feature information is respectively input into the CART prediction models corresponding to the application A, the application B, the application C, the application D, and the application E, that is, the current state feature information is respectively input into the CART prediction model A1, CART prediction model B1, CART prediction model C1, CART prediction model D1, and CART prediction model E1.

For each application, the CART prediction model corresponding to the application can be understood as a learning model that quickly determines the probability that the current application is about to be initiated after the current state feature information is input. The CART prediction model can be generated based on the usage regularity of the application corresponding to the historical state feature information of the terminal device. That is, the usage regularity of the application corresponding to the historical state feature information of the terminal device is taken as a training sample, and the training sample is trained and learned according to a CART algorithm, to generate the CART prediction model.

At block 103, a target application to be initiated is predicted according to output results of the CART prediction models.

In the implementation of the disclosure, the target application to be initiated is predicted according to the output results of the CART prediction models each corresponding to an application in the preset application set. It can be understood that, for each CART prediction model corresponding to an application in the preset application set, after the current state feature information is input, the CART prediction model outputs a probability value to indicate the probability that the current application is about to be initiated. The target application is determined based on the probability values that each application in the preset application set is about to be initiated. For example, an application corresponding to a maximum probability value among all the probability values may be taken as the target application to be initiated, or applications corresponding to two maximum probability values among all the probability values may be taken as the target application to be initiated.

As an implementation, the target application to be initiated is predicted according to output results of the CART prediction models as follows. A probability value output by a leaf node that matches the current state feature information in each CART prediction model is acquired. N probability values having the greatest values are selected from all the acquired probability values, where N is a positive integer greater than or equal to one. Applications corresponding to the selected N probability values are determined as the target applications to be initiated. The advantage of such a setting is that not only can the probability value that each application in the preset application set to be initiated be acquired, but a preset number of applications can also be selected, according to user requirements based on the respective probability values, as the application to be initiated, to meet user requirements.

In this implementation, for the CART prediction models each corresponding to an application in the preset application set, the current state feature information is input into each CART prediction model. In each CART prediction model, there is one and only one leaf node that matches the current state feature information. Therefore, the probability value output by the leaf node matching the current state feature information in each CART prediction model can be acquired. In the exemplary implementation, the preset application set includes five applications which are named application A, application B, application C, application D, and application E. The CART prediction models corresponding to the application A, the application B, the application C, the application D, and the application E are respectively named CART prediction model A1, CART prediction model B1, and CART prediction model C1, CART prediction model D1 and CART prediction model E1. In the above five CART prediction models, the probability values respectively output by the leaf nodes matching the current state feature information are $P_A$, $P_B$, $P_C$, $P_D$, and $P_E$, that is, the probability that the application A is about to be initiated is $P_A$, the probability that the application B is about to be initiated is $P_B$, the probability that the application C is about to be initiated is $P_C$, the probability that the application D is about to be initiated is $P_D$, and the probability that the application E is about to be initiated is $P_E$. N probability values having the greatest values are selected from all the acquired probability values, where N is a positive integer greater than or equal to one, and N is less than or equal to the number of applications in the preset application set. Applications corresponding to the selected N probability values are determined as the target applications about to be initiated. For example, in a case that $P_A=0.5$, $P_B=0.03$, $P_C=0.11$, $P_D=0.34$, $P_E=0.02$. From the five probability values of $P_A$, $P_B$, $P_C$, $P_D$, and $P_E$, two probability values $P_A$ and $P_D$ which have the maximum values are selected, and the application A corresponding to the $P_A$ and the application D corresponding to the $P_D$ are taken as the target application about to be initiated.

As an implementation, N probability values having the greatest values are selected from the acquired probability values as follows. Storage space information of the terminal device is acquired, the value of N is determined according to the storage space information, and then N probability values having the greatest values are selected from the acquired probability values. The advantage of such a setting is that the number of the target applications to be initiated can be reasonably determined according to the storage space information of the terminal device. Therefore, the application to be initiated can be reasonably preloaded without affecting an occupancy rate of system resources, and fluency of the application in use and user experience can be further improved.

The storage space information of the terminal device may include a size of remaining storage space of the terminal device at a current moment, and may also include an occupancy rate of the storage space of the terminal device at the current moment. It can be understood that, the storage space information reflects a size of the storage space available in the terminal device at the current moment. The greater the remaining storage space, the greater the storage space available of the terminal device, and the greater the number of target applications that can be loaded is. Similarly, the lower the occupancy rate of the storage space, the greater the storage space available of the terminal device, and the greater the number of target applications that can be loaded is. The value of N is determined according to the storage space information. When the storage space available in the terminal device is determined to be greater according to the storage space information, the value of N can be set larger; and when the storage space available in the terminal device is determined to be smaller according to the storage space information, the value of N can be set smaller. Finally, N probability values having the greatest values are selected from the acquired probability values, and applications corresponding to the selected N probability values are determined as the target application to be initiated.

At block 104, the target application is preloaded.

In the implementations of the disclosure, a specific process of the preloading and loaded data resources are not limited. For example, corresponding hardware resources may be assigned for the target application, and relevant data required for the initiation is loaded based on the assigned hardware resources. In addition, the loaded data resources can be determined according to a specific type of the target application. For example, if the target application is a social networking software, a splash screen, a contact list, and recent message records of the application can be preloaded. If the target application is a game software, data related to game background and the like of the application can be preloaded.

After the target application is preloaded, if the user really wants to use the target application, initiation of the target application (such as clicking an application icon corresponding to the target application) will be triggered. At this time, since all or part of the resources used for the initiation have been preloaded, the initiation speed of the target application will be significantly increased, which can reduce the user's waiting time, thereby improving use efficiency and fluency in use when the user uses the target application.

According to the method for preloading the application provided in the implementation of the disclosure, the current state feature information of the terminal device is acquired, when an application preloading prediction event is detected to be triggered. The current state feature information is respectively input into a plurality of CART prediction models each corresponding to an application in a preset application set, where each of the CART prediction models is generated based on a usage regularity of an associated applications corresponding to the historical state feature information of the terminal device. A target application to be initiated is predicted according to the output results of the CART prediction models, and the target application is preloaded. By adopting the above technical solution, the technical problems of preloading too many resources for the applications, occupying too many resources, increasing power consumption, and even affecting fluency on the use of the terminal can be solved. In addition, accuracy of predicting the application to be initiated can be improved effectively, system power consumption and memory occupancy rate of the terminal can be further reduced, and application preloading mechanisms can be optimized.

In some implementations, before the application preloading prediction event is detected to be triggered, the method may further include the following. Samples for each application in the preset application set are collected during a preset sampling period, and a plurality of CART prediction models each corresponding to an application in the preset application set are respectively built. The advantage of such a setting is that application usage records that truly reflect user behavior can be fully utilized, which can optimize the application preloading mechanisms and improve the accuracy of predicting the application to be initiated. The preset sampling period can indicate the duration of continuous sample collection, and the sample collection is performed at a predetermined sampling frequency within a preset sampling period. The preset sampling period may be determined according to conditions such as the characteristics of the terminal device, the user's usage requirements, etc., which are not limited in the disclosure. For example, since most users use smart phones almost every day, a short preset sampling period can be set, such as half a month. If a usage frequency is relatively high (such as a long time per day), a much shorter preset sampling period can be set, such as a week. The sampling frequency is not limited in the implementation of the disclosure. For example, it can be determined based on how often or frequently the user uses the application, for example, it can be 3 minutes.

Furthermore, collecting samples for each application in the preset application set during the preset sampling period, and building a plurality of CART prediction models each corresponding to an application in the preset application set include the following. Real-time state feature information of the terminal device is acquired, for each application in the preset application set, at a sampling time point in the preset sampling period, and the real-time state feature information is taken as a sample of a current application. Whether the current application is used within a predetermined time period starting from the each sampling time point is monitored, and a monitoring result is recorded as a sample label of the current sample. The CART prediction model corresponding to the current application is built according to the samples collected in the preset sampling period and the corresponding sample labels. The advantage of such a setting is that the usage regularities of the associated applications corresponding to the historical state feature information of the terminal device can be fully utilized, to generate the CART prediction models, which can further optimize the application preloading mechanisms and improve the accuracy of predicting the application to be initiated.

In the implementation of the disclosure, samples for each application in the preset application set are collected during the preset sampling period, and a plurality of CART prediction models each corresponding to an application in the preset application set are respectively built. It can be understood that, a training sample set corresponding to each application can be acquired by sampling for each application in the preset sampling period. For each training sample set, a CART prediction model of the application corresponding to the current training sample set is built based on a preset CART algorithm. Exemplarily, for each application in the preset application set, the real-time state feature information of the terminal device at the sampling time point is acquired in the preset sampling period as a sample of the current application. For example, the preset sampling period is set to one week, and the preset sampling frequency is 3 minutes, that is, the sampling for each application in the preset application set is performed once every three minutes in the preset sampling period of one week. The real-time state feature information for each application at the sampling time point is acquired as a sample for each application.

It can be understood that, for each application in the preset application set, a first sampling begins at the initial time of the preset sampling period. For example, if the initial time of the preset sampling period is 8:00 am, a first sampling is performed at 8:00 am, and the real-time state feature information of the terminal device at 8:00 am is acquired as a first sample of the current application; a second sampling is performed at 8:10 am, and the real-time state feature information of the terminal device at 8:10 am is acquired as a second sample of the current application; a third sampling is performed at 8:20 am, and the real-time state feature information of the terminal device at 8:20 am is acquired as a third sample of the current application, and so on. The preset sampling period may be set according to the sampling frequency (that is, the frequency of sampling). For example, if the sampling is performed more frequently, the preset sampling period can be adaptively set shorter; if the sampling is performed less frequently, the preset sampling period can be adaptively set longer. For another example, the preset sampling period can also be adaptively set according to user requirements. If high prediction accuracy is required for the application to be initiated, the preset sampling period can be set longer; if low prediction accuracy is required for the application to be initiated, the preset sampling period can be set shorter. For still another example, the preset sampling period may also be set according to a capability of processing data volume by the terminal. If the terminal has a high capability to process the data volume of the training sample for building the CART prediction models, the preset sampling period may be set longer; if the terminal has a low capability to process the data volume of the training sample for building the CART prediction models, the preset sampling period may be set shorter. In this implementation, a length and a setting manner of the preset sampling period are not limited.

Similar to the current state feature information, the real-time state feature information may further include at least one of: time information, a date category, a switching state of a mobile data network, a connection state of a wireless hotspot, identity information of a connected wireless hotspot, applications currently running, a previous foreground application, a duration of a current application staying in the background, a time point at which the current application was last switched to the background, plugging and unplugging states of an earphone jack, a charging state, power information of a battery, a display duration of a screen, motion state and location information of the terminal device.

In the implementation of the disclosure, in the preset sampling period, the real-time state feature information of the terminal device at the each sampling time point is acquired as the samples of the current application. Whether the current application is used within a predetermined time period starting from the each sampling time point is monitored. Exemplarily, the real-time state feature information of the terminal device at 8:00 am is acquired as the first sample of the current application. Thereafter, whether the current application is used within the predetermined time period starting from the sampling time point is detected. For example, if the predetermined time period is five minutes starting from the each sampling time point, whether the current application is used in the time period of 8:00 am to 8:05 am is detected. The current application being used within the predetermined time period starting from the sampling time point may include the following. The current application is initiated within the predetermined time period starting from the sampling time point, that is, the current application is not running in the background of the terminal device, but it is directly initiated. Alternatively, the current application is switched from running in the background to running in the foreground of the terminal device within the predetermined time period starting from the sampling time point. The monitoring results are recorded as the sample labels of the samples of the current application, where the monitoring results indicate whether the current application is used within the predetermined time period starting from the each sampling time point. For example, when the current application is detected to be used within the predetermined time period starting from the sampling time point, "1" is used to indicate such a situation and the sample is labeled as "1", in other words, "1" is used as a sample label of the current sample; when the current application is detected not to be used within the predetermined time period starting from the sampling time point, "0" is used to indicate such a situation and the sample is labeled as "0", in other words, "0" is used as a sample label of the current sample.

For each application in the preset application set, the CART prediction model corresponding to the current application is built according to the samples collected in the preset sampling period and the corresponding sample labels. It can be understood that, the samples collected in the preset sampling period and the corresponding sample labels are taken as a training sample set, and then the training sample set is trained based on a preset CART algorithm to generate the CART prediction model.

In some implementations, the CART prediction model corresponding to the current application is built according to the samples collected in the preset sampling period and the corresponding sample labels as follows. For each state feature in the real-time state feature information, a Gini index of a current state feature is calculated based on a preset Gini index algorithm, a state feature having the smallest Gini index is sequentially selected as a split feature, and a CART prediction model corresponding to the current application is built according to the samples collected in the preset sampling period and the corresponding sample labels. The advantage of such a setting is that the CART prediction models can be built simply and quickly, and the building precision of the CART prediction model can be improved, thereby improving the accuracy of the prediction of the application to be initiated.

In the implementation of the disclosure, for each state feature in the real-time state feature information, a Gini index of a current state feature is calculated based on the preset Gini index algorithm. That is, based on the preset Gini index algorithm, the Gini index of each state feature in the real-time state feature information is calculated. For example, if the real-time state feature information includes ten state features, the Gini indexes of the ten state features are respectively calculated based on the preset Gini index algorithm. Exemplarily, for the application B in the preset application set, the samples collected in the preset sampling period and the corresponding sample labels form a training sample set Y for a corresponding CART prediction model, and a certain state feature in the second feature information is X. For the state feature X=x, when tested as "yes" or "no", the training sample set Y can be divided into two subsample sets $Y_1$ and $Y_2$. Exemplarily, the connection state of the wireless hotspot includes the connected state and the disconnected state of the wireless hotspot, where "1" indicates that the wireless hotspot is in the connected state and "0" indicates that the wireless hotspot is in the disconnected state. As a result, in the case that the state feature X indicates the connection state of the wireless hotspot, the value of X can be 0 or 1. For X=1, when tested as "yes" or "no", the training sample set Y can be divided into two subsample sets $Y_1$ and $Y_2$. That is, regarding to the connection state of the wireless hotspot, the training sample set Y can be divided into two subsample sets $Y_1$ and $Y_2$ respectively. It is to be noted that, the subsample set $Y_1$ indicates that the wireless hotspot is in the connected state and the subsample set $Y_2$ indicates that the wireless hotspot is in the disconnected state. In this case, the Gini index of the state feature X is calculated as follows.

$$Gini(Y, X) = \frac{|Y_1|}{|Y|} Gini(Y_1) + \frac{|Y_2|}{|Y|} Gini(Y_2).$$

Regarding to the above formula, $$Gini(Y_i) = \sum_{k=1}^{2} p_k(1 - p_k) = 1 - \sum_{k=1}^{K} p_k^2,$$

k=1, 2, which denotes two states "used" and "unused" of the current application in $Y_i$. For example, k=1 indicates the case where the current application is in used in $Y_i$, and k=0 indicates the case where the current application is not in used in $Y_i$. $p_k$ denotes the probability of the "used" samples in the subsample set $Y_i$ and the probability of the "unused" samples in the subsample set $Y_i$, where the "used" samples represent that the current application is used, and the "unused" samples represent that the current application is not used. For example, $p_1$ denotes the probability of the "used" samples in the subsample $Y_i$, where the "used" samples represent that the current application is used; $p_0$ denotes the probability of the "unused" samples in the subsample $Y_i$, where the "unused" samples represent that the current application is not used sample in the subsample $Y_i$, where the "unused" sample represents that the current application is not used. In the process of constructing the CART prediction model, the state feature having the smallest Gini index is sequentially selected as the split feature, and the CART prediction model corresponding to the current application is built according to the samples collected in the preset sampling period and the corresponding sample labels. It is to be understood that, the state feature having the smallest Gini index is sequentially selected as the split feature of each split node in the CART prediction model; two child nodes are generated from a current split node; and the training sample set Y is sequentially assigned to the two child nodes according to the state feature. The above process will not stop until a stopping condition for building the CART prediction model is met. The stopping condition may include a condition that a Gini index is less than a preset threshold, and may also include a condition that all subsamples in the two child nodes split belong to the same category.

Figure 2:
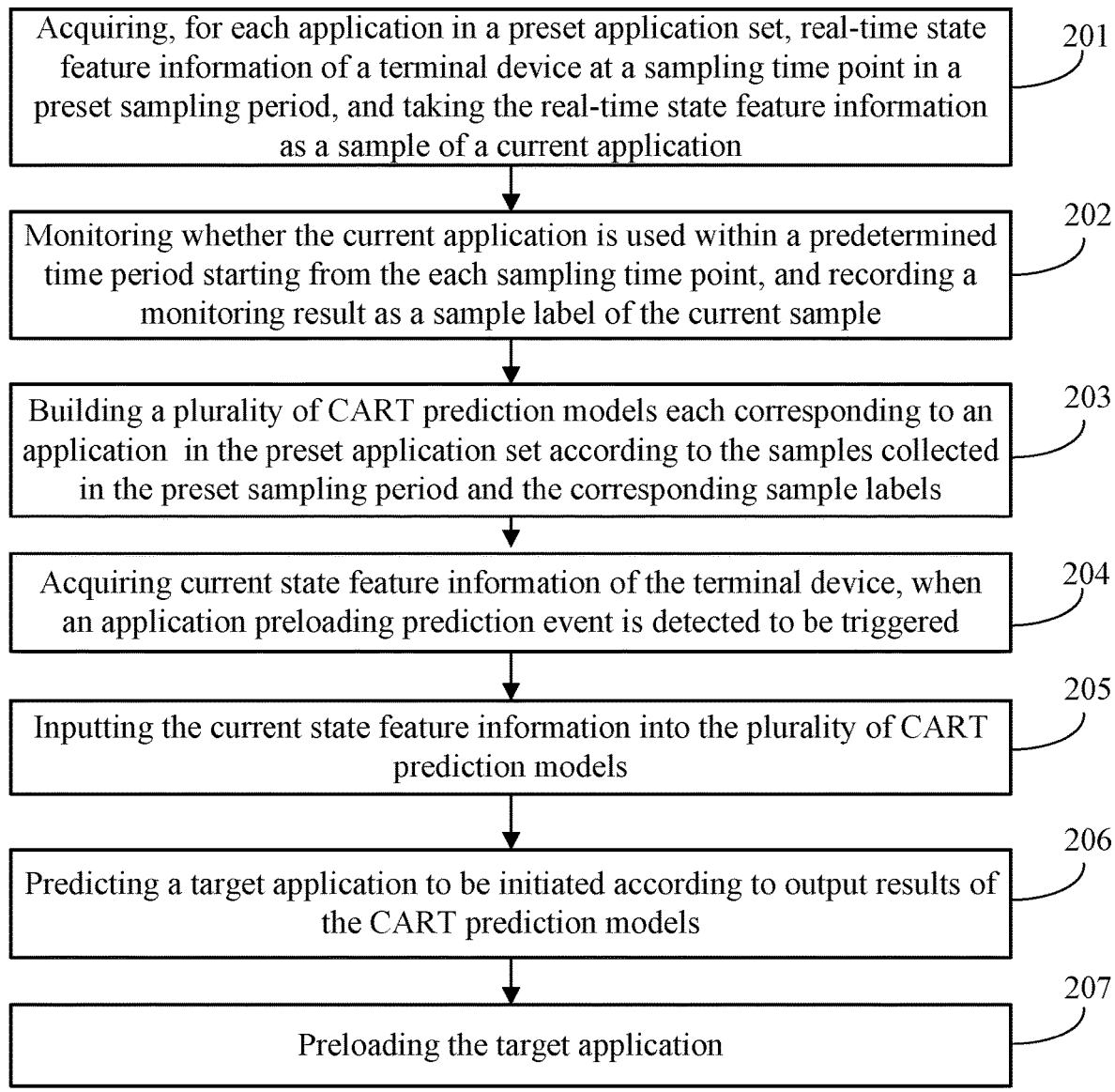
FIG. 2 is a schematic flowchart of another method for preloading an application according to an implementation of the disclosure.

FIG. 2 is a schematic flowchart of another method for preloading an application according to an implementation of the disclosure. The method begins at block 201.

At block 201, for each application in a preset application set, real-time state feature information of a terminal device is acquired at a sampling time point in a preset sampling period, and the real-time state feature information is taken as a sample of a current application.

At block 202, whether the current application is used within a predetermined time period starting from the each sampling time point is monitored, and a monitoring result is recorded as a sample label of the current sample.

At block 203, a plurality of CART prediction models each corresponding to an application in the preset application set are built according to the samples collected in the preset sampling period and the corresponding sample labels.

That is, each CART prediction model is generated based on a usage regularity of an associated application corresponding to historical state feature information of the terminal device.

At block 204, current state feature information of the terminal device is acquired, when an application preloading prediction event is detected to be triggered.

At block 205, the current state feature information is respectively input into the plurality of CART prediction models.

At block 206, a target application to be initiated is predicted according to output results of the CART prediction models.

At block 207, the target application is preloaded.

It should be noted that, when the CART prediction models each corresponding to an application in the preset application set is built, the CART prediction models may be generated by the terminal device acquiring corresponding samples and sample labels and performing training to the acquired samples and sample labels. The CART prediction models may also be generated by a server acquiring corresponding samples and sample labels and performing training to the acquired samples and sample labels. When the terminal device needs to input the current state feature information into the CART prediction model corresponding to the current application, the corresponding CART prediction model can be called directly from the server.

According to the method for preloading the application provided in the implementation of the disclosure, the usage regularities of the applications corresponding to the historical state feature information of the terminal device can be fully utilized, to generate the CART prediction models, so as to further optimize the application preloading mechanisms and improve the accuracy of predicting the application to be initiated.

Figure 3:
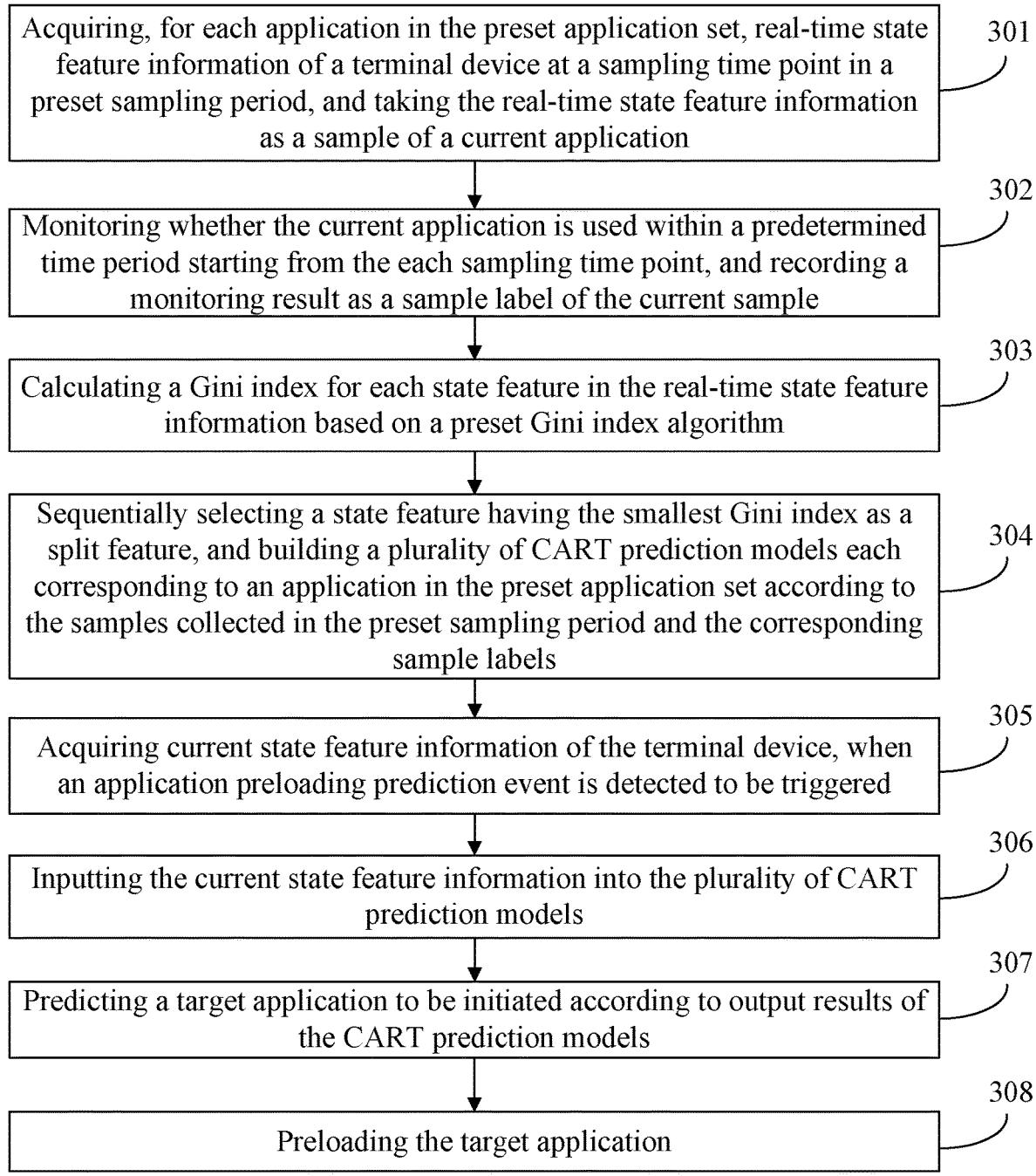
FIG. 3 is a schematic flowchart of yet another method for preloading an application according to an implementation of the disclosure.

FIG. 3 is a schematic flowchart of another method for preloading an application according to an implementation of the disclosure. The method begins at block 301.

At block 301, for each application in a preset application set, real-time state feature information of a terminal device is acquired at a sampling time point in a preset sampling period, and the real-time state feature information is taken as a sample of a current application.

At block 302, whether the current application is used within a predetermined time period starting from the each sampling time point is monitored, and a monitoring result is recorded as a sample label of the current sample.

At block 303, a Gini index for each state feature in the real-time state feature information is calculated based on a preset Gini index algorithm.

At block 304, a state feature having the smallest Gini index is sequentially selected as a split feature, and a plurality of CART prediction models each corresponding to an application in the preset application set are built according to the samples collected in the preset sampling period and the corresponding sample labels.

That is, each CART prediction model is generated based on a usage regularity of an associated application corresponding to historical state feature information of the terminal device.

At block 305, current state feature information of the terminal device is acquired, when an application preloading prediction event is detected to be triggered.

At block 306, the current state feature information is respectively input into the plurality of CART prediction models.

At block 307, a target application to be initiated is predicted according to output results of the CART prediction models.

At block 308, the target application is preloaded.

According to the method for preloading the application provided in the implementation of the disclosure, the CART prediction models can be built simply and quickly, and the building precision of the CART prediction model can be improved, thereby improving the accuracy of the prediction of the application to be initiated.

Figure 4:
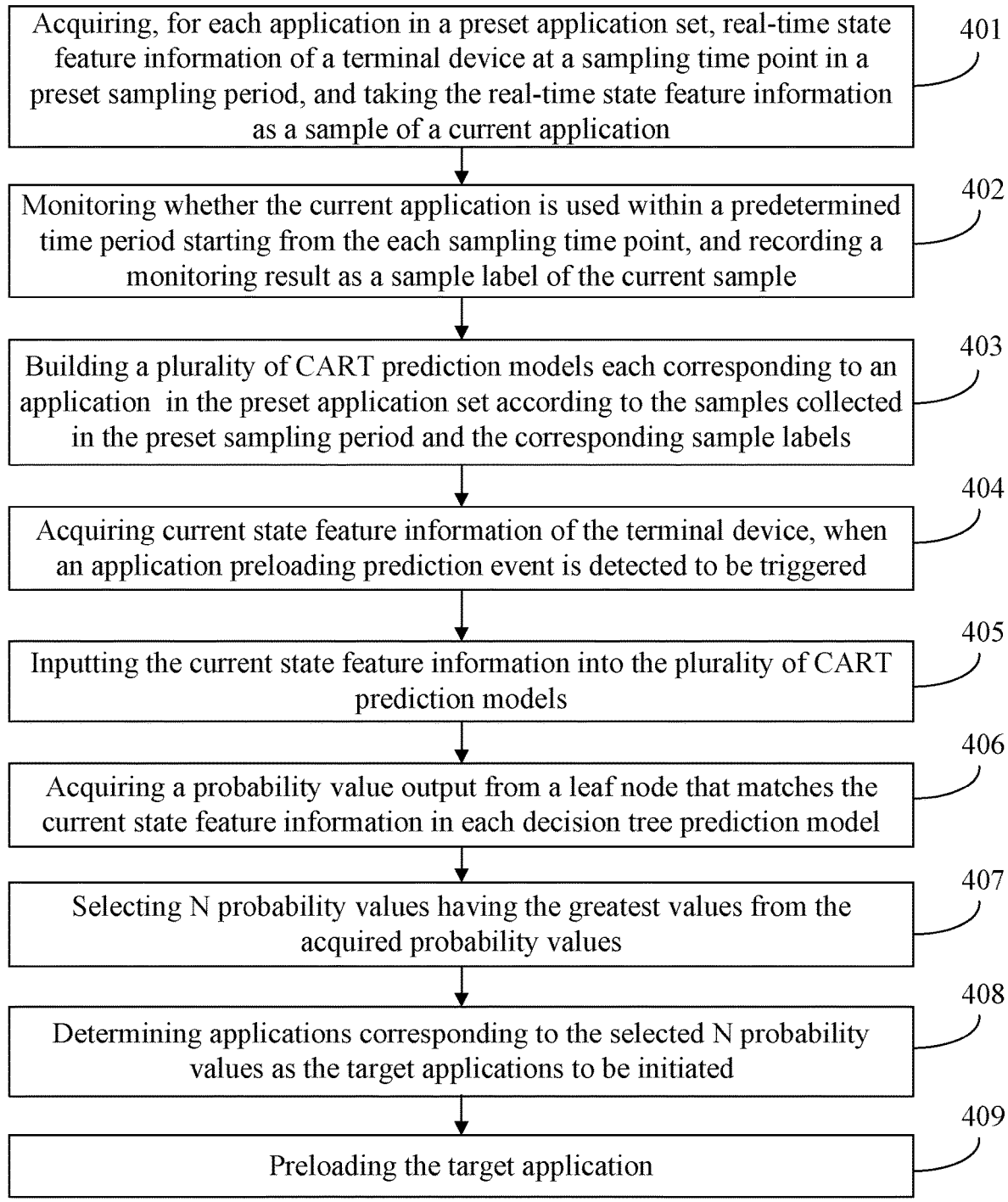
FIG. 4 is a schematic flowchart of still another method for preloading an application according to an implementation of the disclosure.

FIG. 4 is a schematic flowchart of another method for preloading an application according to an implementation of the disclosure. The method begins at block 401.

At block 401, for each application in a preset application set, real-time state feature information of the terminal device is acquired at a sampling time point in a preset sampling period, and the real-time state feature information is taken as a sample of a current application.

At block 402, whether the current application is used within a predetermined time period starting from the each sampling time point is monitored, and a monitoring result is recorded as a sample label of the current sample.

At block 403, a plurality of CART prediction models each corresponding to an application in the preset application set are built according to the samples collected in the preset sampling period and the corresponding sample labels.

That is, each CART prediction model is generated based on a usage regularity of an associated application corresponding to historical state feature information of the terminal device.

At block 404, current state feature information of the terminal device is acquired, when an application preloading prediction event is detected to be triggered.

At block 405, the current state feature information is respectively input into the plurality of CART prediction models.

At block 406, a probability value output by a leaf node that matches the current state feature information is acquired in each CART prediction model.

At block 407, N probability values having the greatest values are selected from the acquired probability values.

In the implementation, the method may further include the following. Storage space information of the terminal device is acquired, and the value of N is determined according to the storage space information.

At block 408, applications corresponding to the selected N probability values are determined as the target applications to be initiated.

At block 409, the target applications are preloaded.

According to the method for preloading the application provided in the implementation of the disclosure, the number of the target applications to be initiated can be reasonably determined according to the storage space of the terminal device. Therefore, the applications to be initiated can be reasonably preloaded without affecting an occupancy rate of system resources, and fluency of the application in use and user experience can be further improved.

Figure 5:
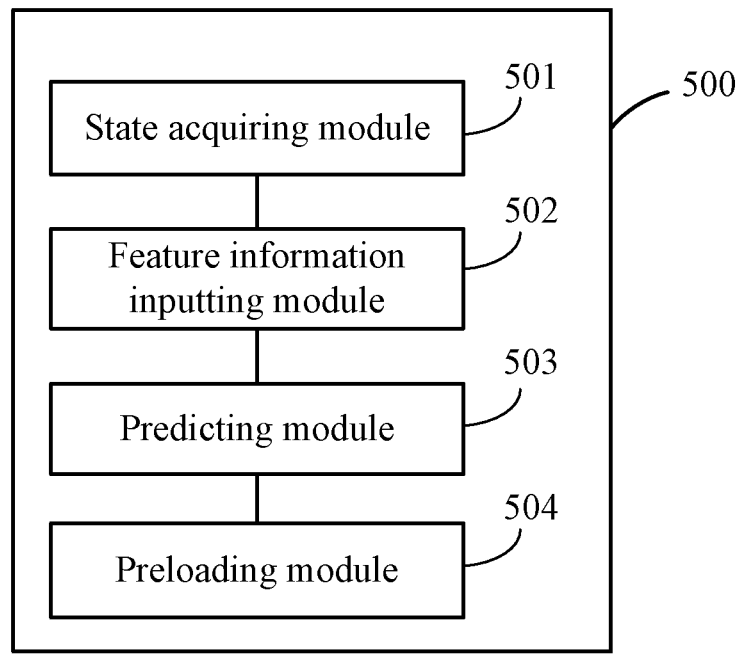
FIG. 5 is a structural block diagram illustrating an apparatus for preloading an application according to an implementation of the disclosure.

FIG. 5 is a structural block diagram illustrating an apparatus for preloading an application according to an implementation of the disclosure. The apparatus may be implemented by software and/or hardware and can be generally integrated in a terminal device. The terminal device may preload an application to be initiated by executing the above method for preloading the application. As illustrated in FIG. 5, the apparatus 500 includes a state acquiring module 501, a feature information inputting module 502, a predicting module 503, and a preloading module 504. In an implementation, the functions of the state acquiring module 501, the feature information inputting module 502, the predicting module 503, and the preloading module 504 may be implemented through a processor.

The state acquiring module 501 is configured to acquire current state feature information of the terminal device, when an application preloading prediction event is detected to be triggered.

The feature information inputting module 502 is configured to input the current state feature information into a plurality of CART prediction models each corresponding to an application in a preset application set, where each of the CART prediction models is generated based on a usage regularity of an associated application corresponding to historical state feature information of the terminal device.

The predicting module 503 is configured to predict a target application to be initiated, according to output results of the CART prediction models.

The preloading module 504 is configured to preload the target application.

According to the apparatus for preloading the application provided in the implementation of the disclosure, the current state feature information of the terminal device is acquired, when an application preloading prediction event is detected to be triggered. The current state feature information is respectively input into a plurality of CART prediction models each corresponding to an application in a preset application set, where each of the CART prediction models is generated based on the usage regularity of an associated applications corresponding to the historical state feature information of the terminal device. A target application to be initiated is predicted according to the output results of the CART prediction models, and then the target application is preloaded. By adopting the above technical solution, the technical problems of preloading too many resources for the applications, occupying too many resources, increasing power consumption, and even affecting fluency on the use of the terminal can be solved. In addition, accuracy of predicting the application to be initiated can be improved effectively, system power consumption and memory occupancy rate of the terminal can be further reduced, and application preloading mechanisms can be optimized.

As an implementation, the apparatus 500 further includes a prediction model building module, which is configured to collect samples for each application in the preset application set in a preset sampling period before the application preloading prediction event is detected to be triggered, and respectively build a plurality of CART prediction models each corresponding to an application in the preset application set.

As an implementation, the prediction model building module includes a prediction model building unit, which is configured to acquire, for each application in the preset application set, real-time state feature information of the terminal device at a sampling time point in the preset sampling period, where the real-time state feature information is taken as a sample of a current application, monitor whether the current application is used within a predetermined time period starting from the each sampling time point, record a monitoring result as a sample label of the current sample, and build the CART prediction model corresponding to the current application according to the samples collected in the preset sampling period and the corresponding sample labels.

As an implementation, the prediction model building unit is further configured to calculate a Gini index for each state feature in the real-time state feature information based on a preset Gini index algorithm, sequentially select a state feature having the smallest Gini index as a split feature, and build, according to the samples collected in the preset sampling period and the corresponding sample labels, the plurality of CART prediction models each corresponding to an application in the preset application set.

As an implementation, the predicting module 503 includes a probability value acquiring unit, a probability value selecting unit, and an application prediction unit.

The probability value acquiring unit is configured to acquire, a probability value output by a leaf node that matches the current state feature information in each CART prediction model.

The probability value selecting unit is configured to select N probability values having the greatest values from the acquired probability values, where N is a positive integer greater than or equal to one.

The application prediction unit is configured to determine applications corresponding to the selected N probability values as the target applications to be initiated.

As an implementation, the probability value selecting unit is further configured to acquire storage space information of the terminal device, determine the value of N according to the storage space information of the terminal device, and select N probability values having the greatest values from the acquired probability values.

As an implementation, the state feature information includes at least one of: time information, a date category, a switching state of a mobile data network, a connection state of a wireless hotspot, identity information of a connected wireless hotspot, applications currently running, a previous foreground application, a duration of a current application staying in the background, a time point at which the current application was last switched to the background, plugging and unplugging states of an earphone jack, a charging state, power information of a battery, a display duration of a screen, motion state and location information of the terminal device.

Implementations of the disclosure further provide a non-transitory computer readable storage medium, on which computer programs are stored. The computer programs are executed by a processor to carry out the following actions.

Current state feature information of the terminal device is acquired, when an application preloading prediction event is detected to be triggered. The current state feature information is input into a plurality of CART prediction models each corresponding to an application in a preset application set, where each of the CART prediction models is generated based on a usage regularity of an associated application corresponding to historical state feature information of the terminal device. A target application to be initiated is predicted according to output results of the CART prediction models, and then the target application is preloaded.

The storage medium refers to any of various types of memory devices or storage devices. The term "storage medium" is intended to include: a mounting medium such as a compact disc read-only memory (CD-ROM), a floppy disk, or a tape device; a computer system memory or a random access memory (RAM) such as a dynamic random access memory (DRAM), a display data random access memory (DDRRAM), a static random access memory (SRAM), an extended data output random access memory (EDORAM) and a Rambus random access memory (Rambus RAM); a non-transitory memory such as a flash memory and a magnetic medium (such as a hard disk or an optical memory); a register and other similar types of memory elements, and the like. The storage medium may also include other types of memory or a combination thereof. In addition, the storage medium may be located in a first computer system in which a program is executed, or may be located in a different second computer system which is coupled to the first computer system via a network, such as the Internet. The second computer system can provide program instructions to the first computer for execution. The term "storage medium" can include two or more storage media that may reside in different locations (e.g. different computer systems connected through a network). The storage medium may store program instructions (e.g., computer programs) executable by one or more processors.

In the implementations of the disclosure, the computer executable instructions contained in the storage medium are not limited to executing the operations of preloading the application as described above, and can also execute relevant operations of the method for preloading the application according to any of the implementations of the disclosure.

Figure 6:
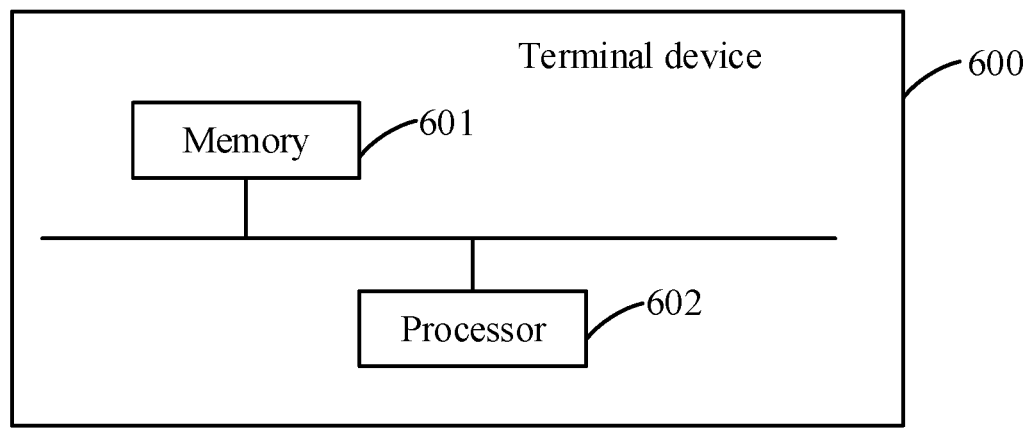
FIG. 6 is a schematic structural diagram illustrating a terminal device according to an implementation of the disclosure.

Implementations of the disclosure provide a terminal device. The apparatus for preloading the application of the implementations of the disclosure can be integrated into the terminal device. FIG. 6 is a schematic structural diagram illustrating a terminal device 600 according to an implementation of the disclosure. The terminal device 600 includes a memory 601, a processor 602, and computer programs stored in the memory 601 and executable by the processor 603. The processor 602 is configured to execute the computer programs to implement the method for preloading the application of the implementations of the disclosure.

According to the terminal device provided in the implementation of the disclosure, the current state feature information of the terminal device is acquired, when an application preloading prediction event is detected to be triggered. The current state feature information is respectively input into a plurality of CART prediction models each corresponding to an application in a preset application set, where each of the CART prediction models is generated based on the usage regularity of an associated applications corresponding to the historical state feature information of the terminal device. A target application to be initiated is predicted according to the output results of the CART prediction models, and then the target application is preloaded. By adopting the above technical solution, the technical problems of preloading too many resources for the applications, occupying too many resources, increasing power consumption, and even affecting fluency on the use of the terminal can be solved. In addition, accuracy of predicting the application to be initiated can be improved effectively, system power consumption and memory occupancy rate of the terminal can be further reduced, and application preloading mechanisms can be optimized.

Figure 7:
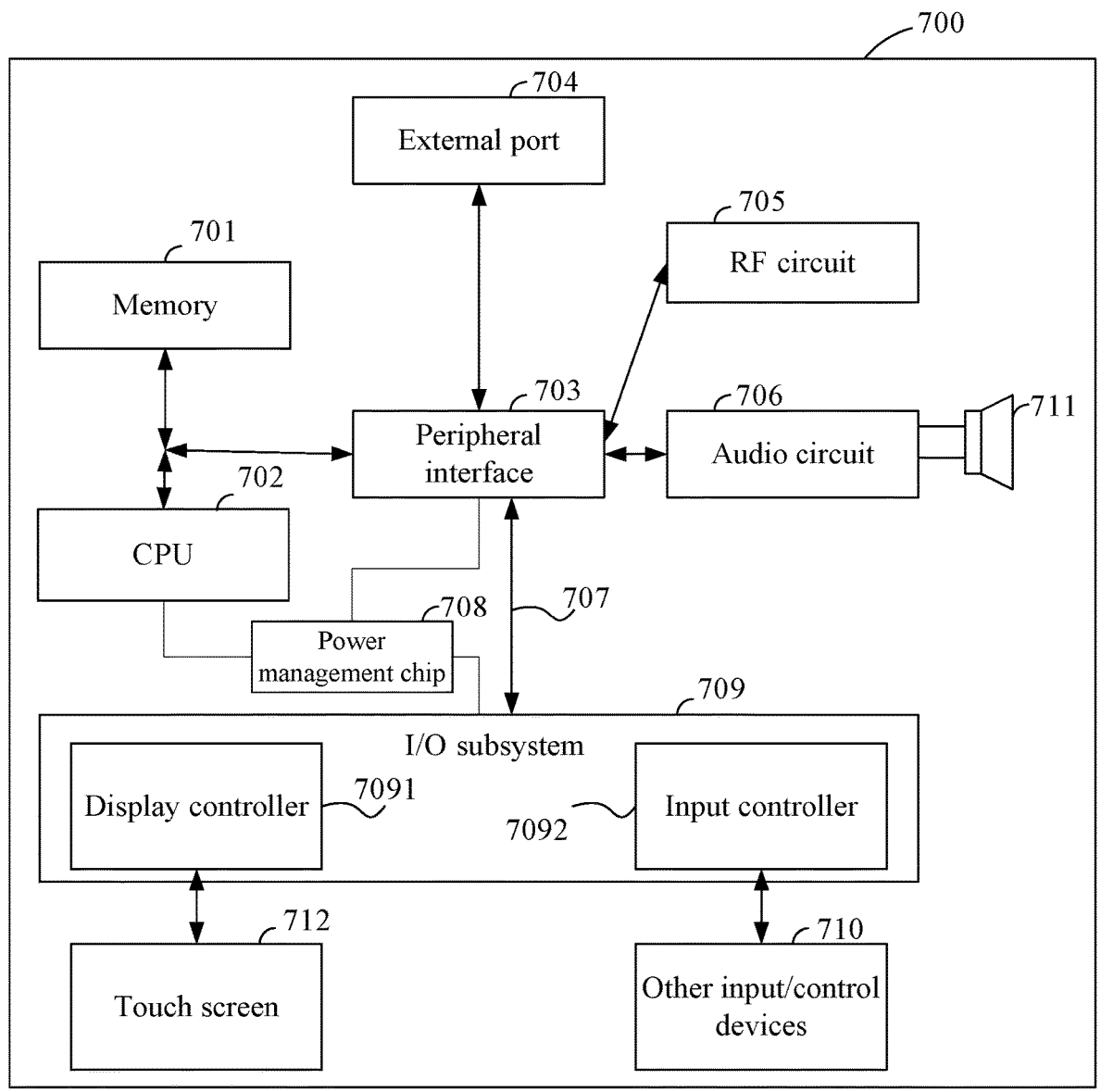
FIG. 7 is a schematic structural diagram illustrating another terminal device according to an implementation of the disclosure.

FIG. 7 is a schematic structural diagram illustrating another terminal device according to an implementation of the disclosure. As illustrated in FIG. 7, the terminal device includes a housing (not illustrated), a memory 701, and a central processing unit (CPU) 702 (also referred to as a processor, hereinafter CPU for short), a circuit board (not illustrated), and a power supply circuit (not illustrated). The circuit board is disposed inside a space defined by the housing. The CPU 702 and the memory 701 are disposed on the circuit board. The power supply circuit is configured to supply power for each circuit or component of the terminal device. The memory 701 is configured to store executable program codes. The CPU 702 is configured to run a computer program corresponding to the executable program codes by reading the executable program codes stored in the memory 701 to carry out the following actions.

Current state feature information of the terminal device is acquired, when an application preloading prediction event is detected to be triggered. The current state feature information is input into a plurality of CART prediction models each corresponding to an application in a preset application set, where each of the CART prediction models is generated based on a usage regularity of an associated application corresponding to historical state feature information of the terminal device. A target application to be initiated is predicted according to output results of the CART prediction models, and the target application is preloaded.

The terminal device further includes a peripheral interface 703, a radio frequency (RF) circuit 705, an audio circuit 706, a speaker 711, a power management chip 708, an input/output (I/O) subsystem 709, other input/control devices 710, a touch screen 712, and an external port 704, which are communicated via one or more communication buses or signal lines 707.

It should be understood that, the terminal device 700 illustrated is only an exemplary mobile terminal, and the terminal 700 may have more or fewer components than those illustrated in FIG. 7. For example, two or more components may be combined, or different component configurations can be adopted in the terminal device. The various components illustrated in FIG. 7 can be implemented in hardware, software, or a combination of hardware and software including one or more signal processing and/or application specific integrated circuits.

The following describes a mobile phone as an example of the terminal device for preloading an application.

The memory 701 is accessible by the CPU 702, the peripheral interface 703 and so on. The memory 701 may include a high-speed RAM and may further include a non-transitory memory such as one or more magnetic disk storage devices, flash memory devices, or other transitory solid-state memory devices.

The peripheral interface 703 is configured to connect the input and output peripherals of the device to the CPU 702 and the memory 701.

The I/O subsystem 709 is configured to connect the input and the output peripherals such as the touch screen 712 and other input/control devices 710 to the peripheral interface 703. The I/O subsystem 709 may include a display controller 7091 and one or more input controllers 7092 configured to control other input/control devices 710. The one or more input controllers 7092 are configured to receive electrical signals from or send electrical signals to other input/control devices 710, where other input/control devices 710 may include a physical button (a press button, a rocker button, etc.), a dial, a slide switch, a joystick, or a click wheel. It should be noted that the input controller 7092 can be coupled with any of a keyboard, an infrared port, a universal serial bus (USB) interface, and a pointing apparatus such as a mouse.

The touch screen 712 functions as an input interface and an output interface between a terminal and a user, and is configured to display a visual output to the user. The visual output may include graphics, text, icons, videos, and the like.

The display controller 7091 in the I/O subsystem 709 is configured to receive an electrical signal from or send an electrical signal to the touch screen 712. The touch screen 712 is configured to detect contact or touch on the touch screen. The display controller 7091 is configured to convert the contact detected into an interaction with a user interface object displayed on the touch screen 712, that is, to realize human-computer interaction. The user interface object displayed on the touch screen 712 may be an icon of a running game, an icon indicating connection to corresponding networks, and the like. It should be noted that, the device may also include a light mouse, which is a touch sensitive surface that does not display a visual output, or can be an extension of a touch sensitive surface formed by the touch screen.

The RF circuit 705 is configured to establish communication between a mobile phone and the wireless network (i.e. network side) and to transmit and receive data between the mobile phone and the wireless network, for example, transmit and receive short messages, emails, and the like. The RF circuit 705 is configured to receive and transmit RF signals (also known as electromagnetic signals), to convert an electrical signal into an electromagnetic signal or convert an electromagnetic signal into an electrical signal, and to communicate with a communication network and other devices through the electromagnetic signals. The RF circuit 705 may include known circuits for performing these functions, including but not limited to an antenna system, an RF transceiver, one or more amplifiers, a tuner, one or more oscillators, a digital signal processor, a coder-decoder (CODEC) chipset, a subscriber identity module (SIM), and so on.

The audio circuit 706 is configured to receive audio data from the peripheral interface 703, to convert the audio data into an electrical signal, and to transmit the electrical signal to the speaker 711.

The speaker 711 is configured to restore the voice signal received by the mobile phone from the wireless network via the RF circuit 705 to sound and to play the sound to the user.

The power management chip 708 is configured for power supply and power management for the hardware connected to the CPU 702, the I/O subsystem 709, and the peripheral interface 703.

The apparatus for preloading the application, the storage medium, and the terminal device provided in the above implementations have corresponding functional modules to execute the method for preloading the application, and thus each contributes to advantageous effects of executing the method. For technical details not described herein, reference may be made to the description of the method for preloading the application.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for preloading an application, performed by a terminal device, the method comprising:
   acquiring current state feature information of the terminal device, when an application preloading prediction event is detected to be triggered;
   inputting the current state feature information into a plurality of classification and regression tree (CART) prediction models each corresponding to an application in a preset application set, to cause each of the CART prediction models to output a probability value indicating a probability that an associated application of the CART prediction model is about to be initiated, wherein each of the CART prediction models is generated based on a usage regularity of its associated application that corresponds to historical state feature information of the terminal device;
   acquiring the probability values output by the plurality of CART prediction models, comprising:
      acquiring a probability value output from a leaf node that matches the current state feature information in each CART prediction model;
   predicting a target application to be initiated according to the probability values output by the CART prediction models, comprising:
      selecting N probability values having the greatest values from the acquired probability values, wherein N is a positive integer greater than or equal to one; and determining applications corresponding to the selected N probability values as target applications to be initiated; and preloading the target application.

2. The method of claim 1, further comprising:

collecting samples for each application in the preset application set in a preset sampling period, and respectively building the plurality of CART prediction models each corresponding to an application in the preset application set.

3. The method of claim 2, wherein collecting the samples for the each application in the preset application set in the preset sampling period, and respectively building the plurality of CART prediction models each corresponding to the application in the preset application set comprises:

acquiring, for each application in the preset application set, real-time state feature information of the terminal device at a sampling time point in the preset sampling period, and taking the real-time state feature information as a sample of a current application;

monitoring whether the current application is used within a predetermined time period starting from the each sampling time point, and recording a monitoring result as a sample label of the current sample; and building the plurality of CART prediction models each corresponding to an application in the preset application set according to the samples collected in the preset sampling period and the corresponding sample labels.

4. The method of claim 3, wherein building the plurality of CART prediction models each corresponding to the application in the preset application set according to the samples collected in the preset sampling period and the corresponding sample labels comprises:

calculating a Gini index for each state feature in the real-time state feature information based on a preset Gini index algorithm; and sequentially selecting a state feature having the smallest Gini index as a split feature, and building the plurality of CART prediction models each corresponding to an application in the preset application set according to the samples collected in the preset sampling period and the corresponding sample labels.

5. The method of claim 1, further comprising:

acquiring storage space information of the terminal device, and determining the value of N according to the storage space information.

6. The method of claim 3, wherein the state feature information comprises at least one of: time information, a date category, a switching state of a mobile data network, a connection state of a wireless hotspot, identity information of a connected wireless hotspot, applications currently running, a previous foreground application, a duration of a current application staying in the background, a time point at which the current application was last switched to the background, plugging and unplugging states of an earphone jack, a charging state, power information of a battery, a display duration of a screen, a motion state, and location information of the terminal device.

7. A non-transitory computer-readable storage medium storing computer programs which, when executed by a processor, cause the processor to:

acquire current state feature information of a terminal device, when an application preloading prediction event is detected to be triggered;

input the current state feature information into a plurality of CART prediction models each corresponding to an application in a preset application set, to cause each of the CART prediction models to output a probability value indicating a probability that an associated application of the CART prediction model is about to be initiated, wherein each of the CART prediction models is generated based on a usage regularity of its associated application that corresponds to historical state feature information of the terminal device;

acquire the probability values output by the plurality of CART prediction models, comprising:

acquiring a probability value output from a leaf node that matches the current state feature information in each CART prediction model;

predict a target application to be initiated according to the probability values output by the CART prediction models, comprising:

selecting N probability values having the greatest values from the acquired probability values, wherein N is a positive integer greater than or equal to one; and determining applications corresponding to the selected N probability values as target applications to be initiated; and preload the target application.

8. The non-transitory computer-readable storage medium of claim 7, wherein the computer programs are further executed by the processor to:

collect samples for each application in the preset application set in a preset sampling period, and respectively build the plurality of CART prediction models each corresponding to an application in the preset application set.

9. The non-transitory computer-readable storage medium of claim 8, wherein the computer programs executed by the processor to collect samples for each application in the preset application set in the preset sampling period, and respectively build the plurality of CART prediction models each corresponding to the application in the preset application set are executed by the processor to:

acquire, for each application in the preset application set, real-time state feature information of the terminal device at a sampling time point in the preset sampling period, and take the real-time state feature information as a sample of a current application;

monitor whether the current application is used within a predetermined time period starting from the each sampling time point, and record a monitoring result as a sample label of the current sample; and build the CART prediction model corresponding to the current application according to the samples collected in the preset sampling period and the corresponding sample labels.

10. The non-transitory computer-readable storage medium of claim 9, wherein the computer programs executed by the processor to build the CART prediction model corresponding to the current application according to the samples collected in the preset sampling period and the corresponding sample labels are executed by the processor to:

calculate a Gini index for each state feature in the real-time state feature information based on a preset Gini index algorithm; and sequentially select a state feature having the smallest Gini index as a split feature, and build the plurality of CART prediction models each corresponding to an application in the preset application set according to the samples collected in the preset sampling period and the corresponding sample labels.

11. The non-transitory computer-readable storage medium of claim 7, wherein the computer programs are further executed by the processor to:
acquire storage space information of the terminal device, and determine the value of N according to the storage space information.

12. A terminal device, comprising:
at least one processor; and
a computer readable storage, coupled to the at least one processor and storing at least one computer executable instruction thereon, which when executed by the at least one processor, cause the at least one processor to:
acquire current state feature information of the terminal device, when an application preloading prediction event is detected to be triggered;
input the current state feature information into a plurality of CART prediction models each corresponding to an application in a preset application set, to cause each of the CART prediction models to output a probability value indicating a probability that an associated application of the CART prediction model is about to be initiated, wherein each of the CART prediction models is generated based on a usage regularity of its associated application that corresponds to historical state feature information of the terminal device;
acquire the probability values output by the plurality of CART prediction models, comprising:
acquiring a probability value output from a leaf node that matches the current state feature information in each CART prediction model;
predict a target application to be initiated according to the probability values output by the CART prediction models, comprising:
selecting N probability values having the greatest values from the acquired probability values, wherein N is a positive integer greater than or equal to one; and
determining applications corresponding to the selected N probability values as target applications to be initiated; and
preload the target application.

13. The terminal device of claim 12, wherein the at least one processor is further caused to:
collect samples for each application in the preset application set in a preset sampling period, and respectively build the plurality of CART prediction models each corresponding to an application in the preset application set.

14. The terminal device of claim 13, wherein the at least one processor caused to collect samples for each application in the preset application set in a preset sampling period, and respectively build the plurality of CART prediction models each corresponding to an application in the preset application set is caused to:
acquire, for each application in the preset application set, real-time state feature information of the terminal device at a sampling time point in the preset sampling period, and take the real-time state feature information as a sample of a current application;
monitor whether the current application is used within a predetermined time period starting from the each sampling time point, and record a monitoring result as a sample label of the current sample; and
build the CART prediction model corresponding to the current application according to the samples collected in the preset sampling period and the corresponding sample labels.

15. The terminal device of claim 14, wherein the at least one processor caused to build the CART prediction model corresponding to the current application according to the samples collected in the preset sampling period and the corresponding sample labels is caused to:
calculate a Gini index for each state feature in the real-time state feature information based on a preset Gini index algorithm; and
sequentially select a state feature having the smallest Gini index as a split feature, and build the plurality of CART prediction models each corresponding to an application in the preset application set according to the samples collected in the preset sampling period and the corresponding sample labels.

16. The terminal device of claim 12, wherein the at least one processor is further caused to:
acquire storage space information of the terminal device, and determine the value of N according to the storage space information.

17. The terminal device of claim 14, wherein the state feature information comprises at least one of: time information, a date category, a switching state of a mobile data network, a connection state of a wireless hotspot, identity information of a connected wireless hotspot, applications currently running, a previous foreground application, a duration of a current application staying in the background, a time point at which the current application was last switched to the background, plugging and unplugging states of an earphone jack, a charging state, power information of a battery, a display duration of a screen, a motion state, and location information of the terminal device.

* * * * *